Figure 1:
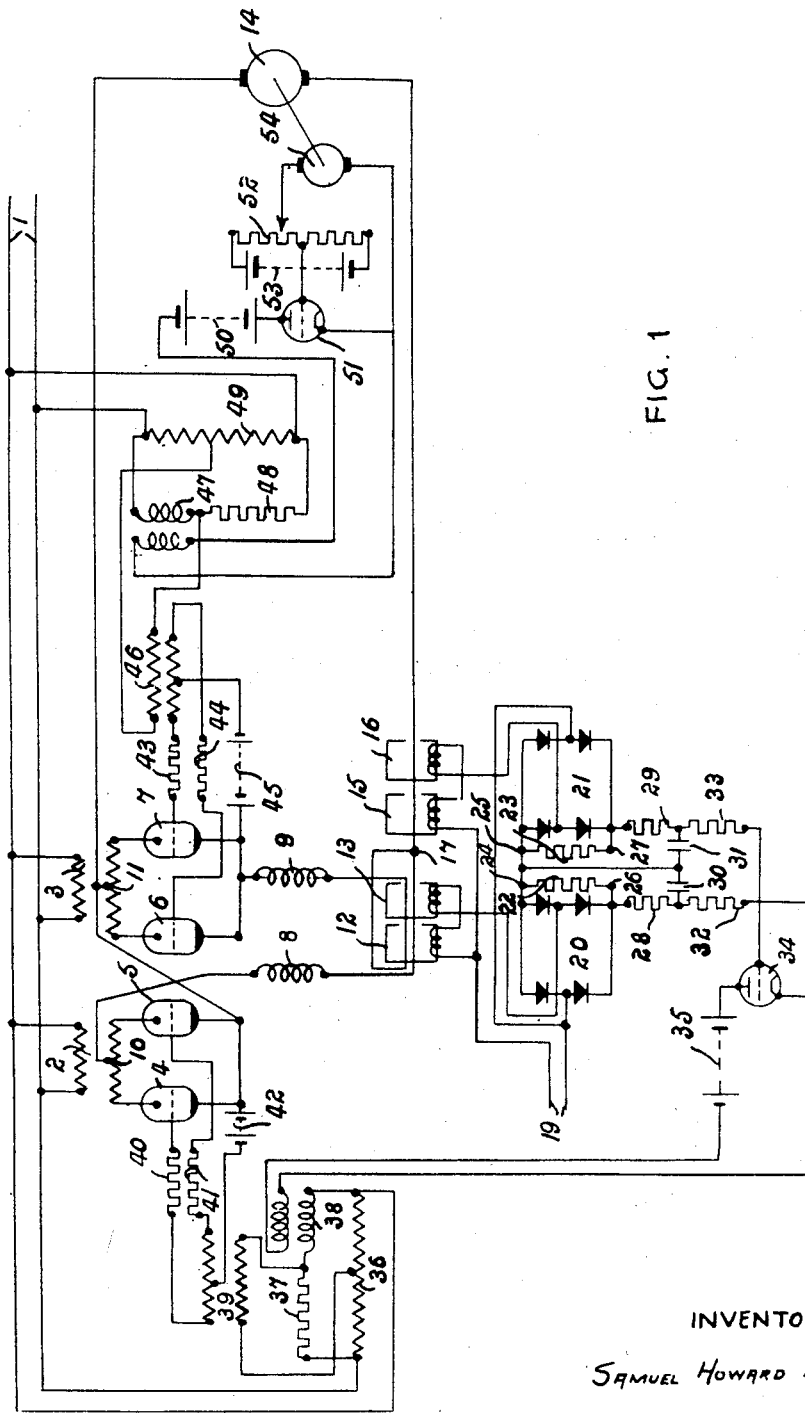

Aug. 30, 1949.    S. H. DALE    2,480,225
REVERSIBLE DIRECT CURRENT MOTOR SYSTEM
Filed March 3, 1947    2 Sheets-Sheet 1

INVENTOR
Samuel Howard Dale
BY
ATTORNEY

INVENTOR
SAMUEL HOWARD DALE
BY
ATTORNEY

Patented Aug. 30, 1949

2,480,225

UNITED STATES PATENT OFFICE 2,480,225

REVERSIBLE DIRECT-CURRENT MOTOR SYSTEM

Samuel Howard Dale, Sutton Coldfield, England, assignor to The General Electric Company, Limited, London, England Application March 3, 1947, Serial No. 732,116
In Great Britain October 10, 1945

Section 1, Public Law 690, August 8, 1946
Patent expires October 10, 1965

8 Claims. (Cl. 318—345)

The present invention relates to reversible direct current motor systems of the type adapted to be operated from an alternating current source and comprising a converter system having two portions connected in parallel and arranged to operate in two alternative ways, in one of which a first portion acts as a rectifier and a second portion acts as an inverter, and in the other of which the first portion acts as an inverter and the second portion acts as a rectifier, each such portion comprising a grid-controlled discharge device.

In such systems the portion acting as a rectifier supplies direct current to the motor and the portion acting as an inverter is used as a brake when slowing down the motor. When reversing the motor, that portion of the converter system acting as an inverter which has served as a brake to bring the motor to rest, subsequently acts as a rectifier to supply direct current of the opposite polarity to the motor. That portion previously acting as a rectifier is then used as an inverter when slowing down the motor. Speed control of the motor is usually effected by controlling the anode firing times of the portion acting as a rectifier, or of both portions.

It is well known to use such a system as an alternative to the Ward-Leonard system for the operation of rolling mill drives, pit winder drives and the like.

Whilst the advantages of the converter system, especially with regard to efficiency and absence of rotating parts is well known, its use has been very restricted up to the present largely due to the difficulty of providing a grid control system which will give stable and reliable operation. The principal problem is that of arranging that under all conditions of working the timing of the impulses to the grids of the two converters shall be such that (a) the anode firing timing of the converter functioning as an inverter shall not be delayed to such an extent that commutation fails, and (b) that the anode firing timing of the two converters with respect to each other shall not be such as to cause an excessive current to circulate between them. The latter condition is the more difficult to fulfil. This will be understood when it is realised that the voltage drops incidental in the converters, namely those due to inductance, resistance and arc loss, subtract from the rectifier output voltage, and add on to the inverter D. C. voltage. Consequently when the machine supplied by the converter system is being accelerated the converter acting as rectifier will be loaded and its output voltage lowered. When the machine supplied by the converter system is being retarded the converter acting as inverter will be loaded and its D. C. voltage is raised. Thus under two conditions which may appear to be symmetrical it will be seen that a different relative anode firing timing between the two converters will be necessary. Consequently any direct coupling of the phase shifting systems used to time the grid impulses will be liable to lead to instability of operation.

It is the principal object of the present invention to provide a system of the type set forth in which the above mentioned disadvantages are removed or substantially reduced.

According to the present invention a reversible direct current motor system of the type set forth is provided with means for automatically controlling the anode timing of one of the said portions in dependence at least mainly and preferably substantially exclusively upon the current circulating between the said portions.

Assuming, for convenience, that the portion having its anode timing controlled as just set forth is named the slave converter, and the other portion is named the master converter, then where, as may be the case, the controlling means require an appreciable time to effect a change in anode timing, the time taken to effect a desired change in current or voltage in the load circuit in response to a signal (hereinafter referred to as the external signal) applied to the master converter will be longer when the load current is flowing in the slave converter than when it is flowing in the master converter.

According to a feature of the invention, a reversible direct current motor system of the kind set forth is provided with means for automatically controlling the anode timing of both said portions in dependence upon the current circulating between the said portions. The external signal may be arranged to vary the anode timing of the two portions substantially equally in opposite senses, and voltages dependent upon the current circulating between the converter portions may be applied to vary the anode timing of the two portions in the same sense.

A further feature of this invention is the provision of means for limiting the maximum current which can flow in either converter irrespective of whether such converter is functioning as a rectifier or as an inverter. This feature is particularly desirable because excessive current flow in an inverter is liable to cause failure of commutation.

Two embodiments of the present invention will now be described, by way of example with reference to Figure 1 of the accompanying drawings, which shows one embodiment according to the present invention, and Figure 2 of the accompanying drawings, which shows a modification of the embodiment shown in Figure 1. Like parts in these drawings have been given like references.

Referring to Figure 1 of the accompanying drawings, an A. C. supply line feeds two transformers 2 and 3. These transformers supply the anodes of grid controlled gas or vapour arc converting devices 4, 5 and 6, 7 each pair of devices 4, 5 and 6, 7 constituting one of the portions of the converter system above referred to. The cathodes of the converters 4 and 5 are connected to the neutral point 11 of the secondary of the transformer 3 and the neutral 10 of the secondary of transformer 2 is connected to the cathodes of converters 6 and 7 through smoothing reactors 8 and 9 and saturable reactors 12 and 13. It will be noted that the arrangement of the D. C. conductors magnetising the reactors 12 and 13 is such that the D. C. flux in them is produced by the sum of the currents flowing from the converters 4, 5 and 6, 7. The output of the combined converters is here shown connected to a D. C. motor 14, the lead from the point 17 being taken through saturable reactors 15 and 16.

The pairs of saturable reactors 15 and 16 and 12 and 13 each have their A. C. windings connected in opposition so as to prevent the D. C. winding from constituting a short circuited secondary winding, and also to prevent transient voltages from being induced in the A. C. windings by a sudden change in the direct current value. The impedance of the A. C. windings will clearly be a function of the converter D. C. and will not depend on the direction of flow of such current.

The reactors 12 and 13 are similar to the reactors 15 and 16 but not necessarily identical. The A. C. windings are excited from an auxiliary source (not shown) connected to 19. This A. C. may have any desired frequency.

An auxiliary rectifying device 20 is connected in series with the reactors 12 and 13 and an auxiliary rectifying device 21 is connected in series with the reactors 15 and 16; 22 and 23 are resistances providing a suitable load for rectifiers 20 and 21 respectively.

It will be seen that the D. C. potential built up across the resistance 22 will always be a function of the sum of the direct currents flowing in the converters 4, 5 and 6, 7. Similarly the D. C. potential built up across the resistance 23 will be a function of the current flowing in the armature of the motor 14. By a suitable design of components these functions may be made reasonably linear. The D. C. flowing through the reactors 12 and 13 will always be equal to the D. C. flowing through the reactors 15 and 16 plus twice the current circulating between the converters 4, 5 and 6, 7. Now, since the D. C. potential across the resistance 22 and 23 may be made substantially proportional to the D. C. flowing in 12, 13 and 15, 16 respectively, it follows that the differences between the potentials built up across 22 and 23 will be substantially proportional to the D. C. circulating between the converters 4, 5 and 6, 7.

The difference in potential across 22 and 23 is obtained across the points 26 and 27 by joining the ends having the same polarity, namely points 24 and 25, of resistances 22 and 23. The ends 26 and 27 are connected to the cathode and grid respectively of the high vacuum valve 34 through a suitable smoothing circuit comprising the resistances 28 and 29 and condensers 30 and 31 and the protective resistances 32 and 33.

The anode current of the valve 34 will therefore be a function of the D. C. circulating between converters 4, 5 and 6, 7.

In order to regulate the converter 4, 5 in such a manner that the circulating current shall remain substantially constant, the anode of the valve 34 is connected with a suitable source 35 of D. C. to a phase adjusting circuit, here shown as comprising the centre tapped reactor or autotransformer 36, the resistance 37 and the saturable reactor 38. The output of the phase shifting circuit is connected to a suitable transformer 39, the secondary of which provides the excitation for the grids or ignitors of the converting devices 4 and 5 through the current limiting resistances 40 and 41 respectively. The neutral point of the secondary of the transformer 39 is connected to the cathodes of 4 and 5 through a source of negative bias 42.

Now it will be seen that by suitably connecting the phase adjusting circuit it can be arranged that any increase in the circulating current between the devices 4, 5 and 6, 7 will cause a retardation in timing of impulses supplied to the grid of the devices 4 and 5, which will tend to reduce the circulating current irrespective of whether the devices 4 and 5 are acting as a rectifier or as an inverter. Similarly if the circulating current falls the control system will tend to increase the circulating current. The accuracy with which the circulating current is maintained at a given value will depend largely on the sensitivity of the valve 34 and the design of the reactors 12, 13, 15, 16 and their associated components. If desired further valve amplification may be added. Now if the timing of the impulses to the converter 6, 7 is altered in order to produce a desired change in the conditions of the motor 14, a change in the circulating current between the devices 4, 5 and 6, 7 will be corrected by the control circuit of the devices 4, 5 and so maintain the timing of the impulses to the devices 4, 5 substantially correct under all conditions of working.

The timing of the impulses to the grids of the converter 6, 7 may now be carried out in any manner which may be expedient to fulfil the requirements of a particular application. In the drawing, a system is shown comprising components 43, 44, 45, 46, 47, 48 and 49 which is substantially the same as that shown for the converter 4, 5 and which has already been described. The saturating current for the reactor 47 is supplied by a source 50 of D. C. and controlled by a valve 51. The grid of the valve is connected to the centre point of a potentiometer 52 excited by a source 53 of D. C. The output of a tachometer generator 54 which is mechanically connected to the armature of the motor 14 is connected between the cathode of the valve 51 and a sliding contact on the potentiometer 52.

Thus by adjusting the sliding contact on the potentiometer 52 the motor 14 may be caused to rotate in either direction and may be accelerated or retarded at will.

It will be appreciated that the converters 4, 5 and 6, 7 may comprise any desired number of vessels either of the single or multianode type, and that the transformers 2 and 3 may be wound for any desired number of phases.

Figure 2:
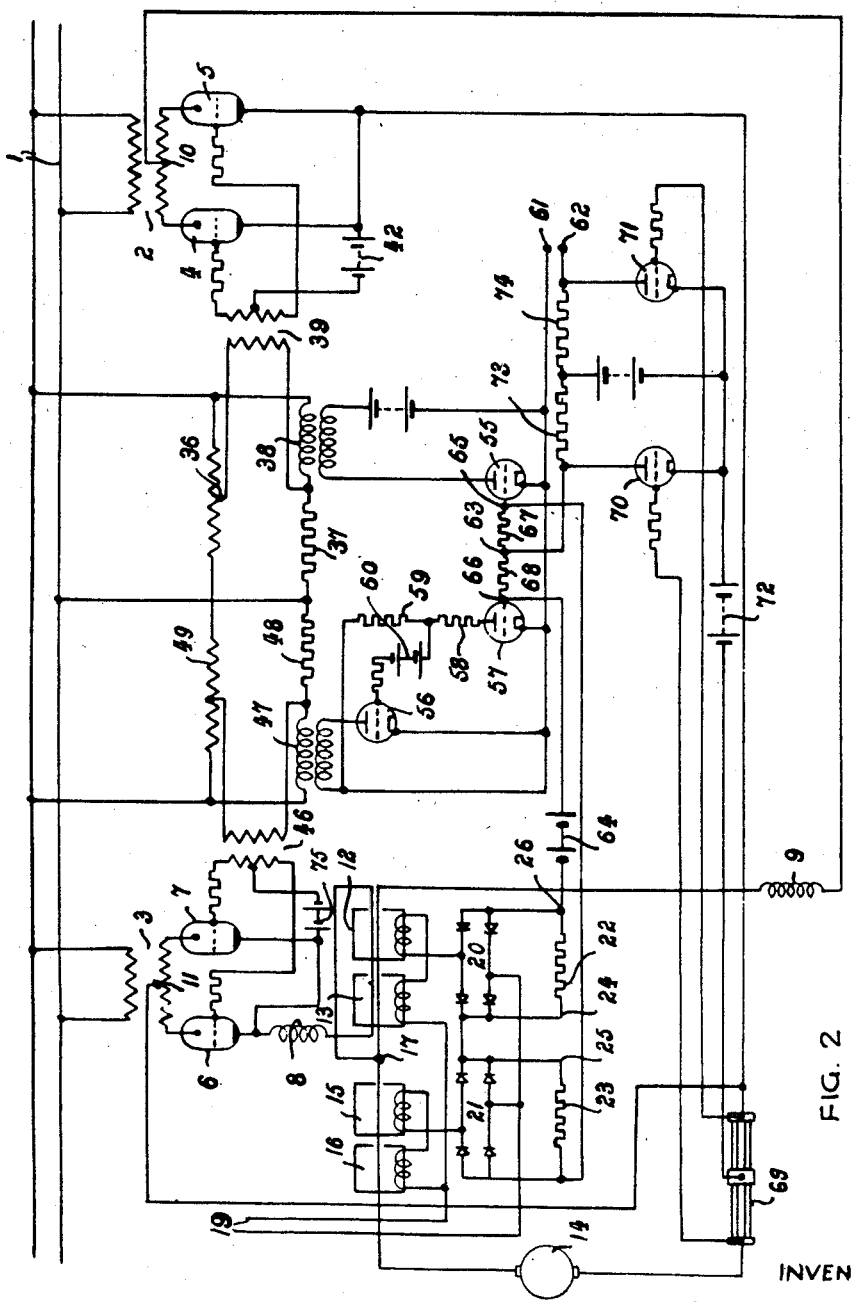

Referring now to Figure 2 of the accompanying drawings, the way in which the potential difference across the resistors 22 and 23 is applied to maintain the current circulating between converters 4, 5 and 6, 7 substantially constant is different from that already described.

The anode timing of the converter 4, 5 will depend upon the current flowing in the saturating winding of the reactor 38 and the anode timing of the converter 6, 7 will depend upon the current flowing in the saturating winding of the reactor 47. It is known that to maintain stable operation, in general, when the anode timing of one converter is advanced, that of the other converter must be retarded. Consequently when the saturating current in one reactor is increased, that in the other saturating winding must be reduced.

In the present embodiment the saturating current in the reactor 38 is the anode current of a valve 55 and that in the reactor 47 is the anode current of a valve 56, the valve 56 being controlled by a valve 57. Resistors 58 and 59 and the source of voltage 60 have such values that when the potential of the grid of valve 57 is changed by a given amount, the potential of the grid of valve 56 is changed by a like amount but in the opposite sense. Thus if the same potential is applied simultaneously to the grids of valves 55 and 57, the anode timing of one converter will be advanced and that of the other converter will be retarded. In this way by applying an external signal in the form of a D. C. potential difference to terminals 61 and 62, and thus between point 63 and the cathodes of the valves 55 and 57, approximately correct relative anode timing may be maintained whilst changing the operation of the motor 14. However it is very unlikely that the relative timing will be maintained sufficiently accurately for stable operation, owing to the voltage drops in the converters and the asymmetry of the adjusting circuits 36, 37, 38 and 47, 48, 49.

Now an error in the relative anode timing of the two converters will produce a change in the current circulating between them and hence a voltage substantially proportional to such change between the points 26 and 27. This voltage is opposed by a source of voltage 64 such that when the circulating current has a desired value no potential difference appears between the points 65 and 66 which are at the extremities of resistors 67 and 68 whose junction point 63 has already been referred to. Any error in circulating current will then produce a potential difference between points 65 and 66 which will change the anode timing of the two converters 4, 5 and 6, 7 in the same sense, the sense being such as to reduce the error.

In order to prevent an excessive current flow in either converter, there is provided a centre-tapped shunt 69 having its two end terminals connected to the grid of two valves 70 and 71 respectively. The centre terminal of the shunt is connected in series with a source of voltage 72 to the cathodes of the valves 70 and 71. The polarity and voltage of the source 72 are so chosen that with no current flowing in the shunt 69 and motor 14, the valves 70 and 71 are biased beyond anode current cut-off and the arrangement is such that when the voltage drop across the shunt 69 reaches a predetermined value, either valve 70 or 71 begins to conduct, which one being dependent on the direction of current flow in the shunt 69. A voltage thus appears across one of the resistors 73 or 74 which are in the anode circuits of the valves and this voltage is arranged to oppose the external signal voltage applied to terminals 61 and 62. The external signal may be arranged to control the armature of the motor 14 with respect to direction of rotation, speed, angular position etc.

In an alternative arrangement of the anode timing control circuit, the anode of the valve 57 is connected directly to the saturating winding of the reactor 47, the valve 57 being omitted and the grid of the valve 56 being connected to the point 66. The points 26 and 27 are then connected through the source 64 to the points 63 and 61 and the external signal terminal 62 is connected through resistors 73 and 74 to point 66, the terminal 61 being connected to the point 65.

I claim:

1. A reversible direct current motor system for operation from an alternating current source, comprising a convertor system having two portions, each portion including a grid-controlled rectifier device, interconnections connecting the anode and cathode of one of said rectifier devices to the cathode and anode respectively of the other of said rectifier devices, a circuit for applying main alternating voltage from said source to the anode-cathode circuits of said rectifier devices, circuits for applying alternating control voltages to the control grids of said rectifier devices, primary control means for varying the phase of at least one of said control voltages relatively to that of said main alternating voltages, whereby said two portions can be arranged to operate in two alternative ways in one of which a first of said portions acts as a rectifier and the second of said portions as an inverter, and in the other of which said first of the portions acts as an inverter and said second of the portions acts as a rectifier, and secondary control means comprising means responsive to current circulating in said interconnections between said portions to vary said phase in dependence upon said current.

2. A reversible direct current motor system as claimed in claim 1 wherein the responsive means are responsive substantially exclusively to the current circulating between the rectifier devices.

3. A reversible direct current motor system for operation from an alternating current source, comprising a convertor system having two portions, each portion including a grid-controlled rectifier device, interconnections connecting the anode and cathode of one of said rectifier devices to the cathode and anode respectively of the other of said rectifier devices, a circuit for applying main alternating voltage from said source to the anode-cathode circuits of said rectifier devices, circuits for applying alternating control voltages to the control grids of said rectifier devices, primary control means for varying the phase of at least one of said control voltages relatively to that of said main alternating voltages, whereby said two portions can be arranged to operate in two alternative ways in one of which a first of said portions acts as a rectifier and the second of said portions as an inverter, and in the other of which said first of the portions acts as an inverter, and said second of the portions acts as a rectifier, and secondary control means comprising means responsive to current circulating in said interconnections between said portions to vary said phase in dependence upon said current, said secondary control means comprising a saturable reactor having a D. C. winding and an A. C. winding, said D. C. winding being connected in at least one of said interconnections, and means responsive to changes in the impedance of said A. C. winding to vary said phase.

4. A reversible direct current motor system for operation from an alternating current source, comprising a convertor system having two portions, each portion including a grid-controlled rectifier device, interconnections connecting the anode and cathode of one of said rectifier devices to the cathode and anode respectively of the other of said rectifier devices, a circuit for applying main alternating voltage from said source to the anode-cathode circuits of said rectifier devices, circuits for applying alternating control voltages to the control grids of said rectifier devices, primary control means for varying the phase of at least one of said control voltages relatively to that of said main alternating voltages, whereby said two portions can be arranged to operate in two alternative ways in one of which a first of said portions acts as a rectifier and the second of said portions as an inverter, and in the other of which said first of the portions acts as an inverter and said second of the portions acts as a rectifier, and secondary control means comprising means responsive to current circulating in said interconnections between said portions to vary said phase in dependence upon said current, said secondary control means comprising a saturable reactor having a D. C. winding and an A. C. winding, said D. C. winding being connected in at least one of said interconnections, terminals for applying A. C. to said A. C. winding, an auxiliary rectifier device connected to rectify current flowing in said A. C. winding, and means for applying rectified voltage from said auxiliary rectifier device to vary said phase.

5. A reversible direct current motor system for operation from an alternating current source, comprising a convertor system having two portions, each portion including a grid-controlled rectifier device, interconnections connecting the anode and cathode of one of said rectifier devices to the cathode and anode respectively of the other of said rectifier devices, a circuit for applying main alternating voltage from said source to the anode-cathode circuits of said rectifier devices, circuits for applying alternating control voltages to the control grids of said rectifier devices, primary control means for varying the phase of at least one of said control voltages relatively to that of said main alternating voltages, whereby said two portions can be arranged to operate in two alternative ways in one of which a first of said portions acts as a rectifier and the second of said portions as an inverter, and in the other of which said first of the portions acts as an inverter and said second of the portions acts as a rectifier, and secondary control means comprising means responsive to current circulating in said interconnections between said portions to vary said phase in dependence upon said current, said secondary control means comprising a saturable reactor having a D. C. winding and an A. C. winding, said D. C. winding being connected in at least one of said interconnections, terminals for applying A. C. to said A. C. winding, an auxiliary rectifier device connected to rectify current flowing in said A. C. winding, a second saturable reactor having a D. C. and an A. C. winding, the last said A. C. winding being connected in one of said circuits for applying control voltages to said grids, terminals for applying a direct voltage to said D. C. winding of said second saturable reactor, an electron discharge valve connected in series with the last said terminals and D. C. winding, and means for applying rectified voltage from said auxiliary rectifier device to a control electrode of said electron discharge device.

6. A reversible direct current motor system for operation from an alternating current source, comprising a converter system having two portions, each portion including a grid-controlled rectifier device, interconnections connecting the anode and cathode of one of said rectifier devices to the cathode and anode respectively of the other of said rectifier devices, a circuit for applying main alternating voltage from said source to the anode-cathode circuits of said rectifier devices, circuits for applying alternating control voltages to the control grids of said rectifier devices, primary control means for varying the phase of at least one of said control voltages relatively to that of said main alternating voltages, whereby said two portions can be arranged to operate in two alternative ways in one of which a first of said portions acts as a rectifier and the second of said portions as an inverter, and in the other of which said first of the portions acts as an inverter and said second of the portions acts as a rectifier, and secondary control means comprising means responsive to current circulating in said interconnections between said portions to vary said phase in dependence upon said current, said secondary control means comprising a saturable reactor having a D. C. winding and an A. C. winding, said D. C. winding being connected in at least one of said interconnections and means responsive to changes in the impedance of said A. C. winding to vary said phase of both of said control voltages in the same sense.

7. A reversible direct current motor system for operation from an alternating current source, comprising a convertor system having two portions, each portion including a grid-controlled rectifier device, interconnections connecting the anode and cathode of one of said rectifier devices to the cathode and anode respectively of the other of said rectifier devices, a circuit for applying main alternating voltage from said source to the anode-cathode circuits of said rectifier devices, circuits for applying alternating control voltages to the control grids of said rectifier devices, primary control means for varying the phase of at least one of said control voltages relatively to that of said main alternating voltages, whereby said two portions can be arranged to operate in two alternative ways in one of which a first of said portions acts as a rectifier and the second of said portions as in inverter, and in the other of which said first of the portions acts as an inverter and said second of the portions acts as a rectifier, and secondary control means comprising means responsive to current circulating in said interconnections between said portions to vary said phase in dependence upon said current, said primary control means comprising two saturable reactors each having a D. C. winding and an A. C. winding, said A. C. windings being connected in the control grid circuits of said rectifier devices respectively, terminals for applying direct voltage to said D. C. windings, two electron discharge valves connected to control the amplitude of direct current flowing in said D. C. windings respectively, and terminals for applying a control signal to control electrodes of said two electron discharge valves, and said secondary control means comprising a third saturable reactor having a D. C. winding and an A. C. winding, the last said D. C. winding being connected in one of said interconnections, terminals for applying alternating voltage to the last said A. C. winding, an auxiliary rectifier device connected to rectify alternating current flowing in the last said A. C. winding and means for applying voltage from said auxiliary rectifier device to control electrodes of said two electron discharge valves.

8. A reversible direct current motor system as claimed in claim 7, and comprising a shunt connected to be traversed by current flowing in both of the first-named rectifier devices, and means for applying voltage developed across said shunt to limit the amplitude of said control signal applied to the control electrodes of said electron discharge valves.

SAMUEL HOWARD DALE.

REFERENCES CITED

The following references are of record in the file of this patent:

UNITED STATES PATENTS

| Number | Name | Date |
|---|---|---|
| 2,259,958 | Levy | Oct. 21, 1941 |
| 2,276,752 | Willis | Mar. 17, 1942 |
| 2,399,387 | Rielly | Apr. 30, 1946 |
| 2,421,632 | Livingston | June 3, 1947 |

FOREIGN PATENTS

| Number | Country | Date |
|---|---|---|
| 686,191 | Germany | Jan. 5, 1940 |